P. SELLERS.
GRAIN-MOISTENING APPARATUS.
No. 178,337. Patented June 6, 1876.
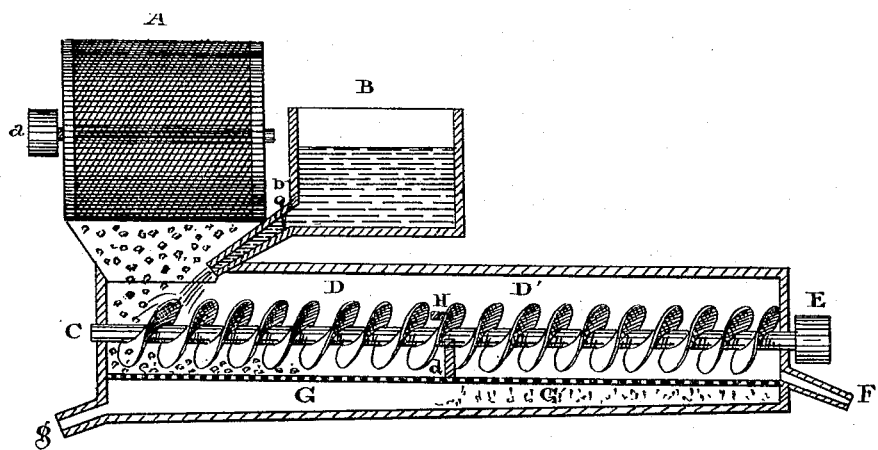
WITNESSES
W. B. Niley
Jacob Stauffer
INVENTOR
Peter Sellers

UNITED STATES PATENT OFFICE.

PETER SELLERS, OF NEAR SPORTING HILL P. O., LANCASTER COUNTY, PA.

IMPROVEMENT IN GRAIN-MOISTENING APPARATUS.

Specification forming part of Letters Patent No. 178,337, dated June 6, 1876; application filed March 10, 1876.

*To all whom it may concern:*

Be it known that I, PETER SELLERS, miller, residing near Sporting Hill P. O., in Lancaster county, and State of Pennsylvania, have invented certain Improvements in the Mode of Scouring or Hulling Wheat and Grain, of which the following is a specification:

This invention relates to that manner of preparing the grain for the hulling-machine which consists in the introduction of running water to the grain as it drops from an ordinary screen into a cylinder or trough, which, in this, is divided into two parts or sections by a partition, the moistened grain passing consecutively through a portion having a water-tight bottom, and a portion having a perforated or draining bottom, by means of a rotating screw-conveyer.

The accompanying drawing, with the letters of reference marked thereon and a brief explanation, will enable any one skilled in the art to make and use the same, and in which—

A represents an ordinary screen, driven by a belt-pulley, *a*. B is a water-tank, with a spout, *b*, that discharges water upon the grain as it falls from the screen into the conveyer, driven by a belt-pulley, E. Said spout or tube *b* may be provided with a valve or stop-cock to shut off the water. The conveyer, whether a cylinder or trough, is divided by a vertical partition, *d*. The front section D has a water-tight bottom, and, if desirable to float out the lighter particles, a side opening can be made to communicate by a tube with a lower draining-chamber, G, to carry off the water, and the use of a gate in the lower part of the partition *d*. The second section D' has the bottom perforated for draining the superfluous water from the grain as it is being conveyed to the hulling-machine.

To prevent the waste water from lodging on the floor there is shown a water-trough, G, under the combined conveyer, with a discharge-pipe, *g*. The spout F discharges the grain into the hopper of the hulling-machine if no intermediate fan or drier is employed.

I am aware that water has been used in the process of removing from the grain its outer husk or bran by the action of water or steam to soften the husk, and that there is no novelty in the use of a water-tank, screen, and conveyer, independently considered, in connection with the ordinary huller; therefore

What I claim as my improvement in the process is—

The conveyer-box, divided into two sections by a partition, *d*, the anterior section D having a water-tight bottom, the other section D' provided with a perforated draining-bottom, and having beneath both a chamber or trough, G, to carry off the waste water, the whole arranged as and for the purpose specified.

PETER SELLERS.

Witnesses:
   W. B. WILEY,
   JACOB STAUFFER.